(12) United States Patent
Evens

(10) Patent No.: US 8,711,568 B2
(45) Date of Patent: Apr. 29, 2014

(54) MECHANICAL AND MOISTURE PROTECTION APPARATUS FOR ELECTRONIC DEVICES

(76) Inventor: Zachary Edward Evens, Branchburg, NJ (US)

( * ) Notice: Subject to any disclaimer, the term of this patent is extended or adjusted under 35 U.S.C. 154(b) by 527 days.

(21) Appl. No.: 13/005,594

(22) Filed: Jan. 13, 2011

(65) Prior Publication Data

US 2012/0181317 A1  Jul. 19, 2012

(51) Int. Cl.
*H05K 7/00* (2006.01)

(52) U.S. Cl.
USPC .............. 361/728; 361/730; 361/732

(58) Field of Classification Search
USPC .............. 361/728–732, 752, 796, 800
See application file for complete search history.

(56) References Cited

U.S. PATENT DOCUMENTS

| | | | | |
|---|---|---|---|---|
| 3,686,616 | A | * | 8/1972 | Bowerman .................. 439/148 |
| 5,229,641 | A | * | 7/1993 | Katayama .................... 257/678 |
| 5,547,388 | A | * | 8/1996 | Hill .............................. 439/135 |
| 6,227,717 | B1 | * | 5/2001 | Ott et al. ....................... 385/53 |
| 6,406,321 | B1 | * | 6/2002 | Hayashi et al. ............... 439/374 |
| 6,769,813 | B2 | * | 8/2004 | Cheng ........................... 385/78 |
| 7,158,376 | B2 | | 1/2007 | Richardson et al. |
| 7,180,735 | B2 | | 2/2007 | Thomas et al. |
| 7,312,984 | B2 | | 12/2007 | Richardson et al. |
| 7,535,799 | B2 | | 5/2009 | Polany et al. |
| 7,563,113 | B2 | * | 7/2009 | Sheng ........................... 439/135 |
| 7,609,512 | B2 | | 10/2009 | Richardson et al. |
| 7,611,371 | B2 | * | 11/2009 | Guo .............................. 439/367 |
| 7,652,892 | B2 | | 1/2010 | Shiu et al. |
| 7,663,879 | B2 | | 2/2010 | Richardson et al. |
| 7,775,354 | B2 | | 8/2010 | Latchford et al. |
| 8,025,510 | B2 | * | 9/2011 | Bolshakov et al. .......... 439/136 |
| 2009/0273480 | A1 | | 11/2009 | Mittleman et al. |
| 2009/0303673 | A1 | | 12/2009 | Holzhausen |
| 2010/0006314 | A1 | | 1/2010 | Wilson, II et al. |
| 2010/0051152 | A1 | | 3/2010 | McElaney et al. |
| 2010/0124010 | A1 | | 5/2010 | Shiu et al. |

\* cited by examiner

*Primary Examiner* — Hung S Bui
(74) *Attorney, Agent, or Firm* — Carl J. Evens

(57) ABSTRACT

The mechanical and moisture protection apparatus for hand-held electronic devices generally comprises a handle for the user, a bearing plate that covers an electrical connector recess in an electronic device, and an insert that fits within the recess. In addition, a sealing means may also be utilized to further ensure a fluid tight seal. The apparatus may be constructed as a one-piece unitary structure or may comprise individual components. The apparatus may be constructed from any number of materials and utilizing any number of fabrication techniques. The apparatus is preferably light weight, inexpensive and easy to assemble.

10 Claims, 3 Drawing Sheets

MECHANICAL AND MOISTURE PROTECTION APPARATUS FOR ELECTRONIC DEVICES

BACKGROUND OF THE INVENTION

1. Field of the Invention

The present invention relates to electronic devices, and more particularly to an apparatus for protecting the multiple pin connector of electronic devices, such as media players, from mechanical damage and moisture damage when being utilized for their intended purpose.

2. Discussion of the Related Art

The handheld consumer electronics market is rapidly expanding and an increasing number of these products include mechanisms for interfacing with other devices. By way of example, handheld consumer electronic products may correspond to cellular phones, personal digital assistants, video games, radios, MP3 players, CD players, DVD players, televisions, game players, cameras and other similar devices. Most of these devices include some sort of connector for making connections to other devices, for example, Firewire, USB, audio out and video in. In addition, some type of external connector is needed for recharging or direct power. Some of these devices are capable of connections to other devices through docking stations or cables. For example, cellular phones have included docking stations for charging the phones and personal digital assistants have included docking stations for connecting within a host computer. Other devices have been capable of wireless connections.

MP3 music players, in particular, have typically made connections to other devices through cable connections. For example, the MP3 music player known as the IPod® manufactured by Apple Computer of Cupertino, Calif. has included a Firewire connector for communicating with a computer. The Firewire connector through a cable connected to the computer generally allows data transmissions to travel back and forth between the MP3 music player and the computer. As should be appreciated, MP3 music players are configured to play MP3 formatted songs. These songs may be uploaded from the computer and thereafter stored in the MP3 player.

The connection between the handheld device and other devices, such as the MP3 player and the computer, is generally accompanied through a cable connector as described above. Accordingly, the MP3 player or other device has a port or receptacle for receiving the cable connector which allows for the establishment of an electrical connection between the devices. However, when not connected, the port or receptacle on the devices may be unprotected. For example, in a typical MP3 player, the port or receptacle on the end face of the device is open to the external environment and may be damaged on contact with foreign substances or materials when being utilized. For example, individuals may carry their MP3 player in their pocket along with other items such as keys and coins. These other items may be of the size that allows them to fit within the port or receptacle, thereby potentially damaging the port. Moisture may also be of concern if the device, during use, is stored in an environment where it may come into contact with water. Accordingly, there exists a need to protect the port from damage without significantly impacting the portability of the device.

SUMMARY OF THE INVENTION

The apparatus of the present invention overcomes the limitations of the prior art devices as briefly set forth above.

In accordance with one aspect, the present invention is directed to a protection apparatus for electronic devices. The protection apparatus for electronic devices comprising a handle element, a bearing plate element affixed to the handle element and configured to cover a recess in an electronic devices, and an insert element affixed to at least one of the handle element or the bearing plate element, the insert element being configured for insertion into and removal from the recess in an electronic device, the insert element frictionally engaging the recess.

In accordance with another aspect, the present invention is directed to a protection apparatus. The protection apparatus for electronic devices comprising a bearing plate configured to cover a recess in an electronic device, the bearing plate comprising an access slot for removal of the protection apparatus, and an insert element affixed to the bearing plate element, the insert element being configured for insertion into and removal from the recess in an electronic device, the insert element frictionally engaging the recess.

The mechanical and moisture protection apparatus for electronic devices is a simple to utilize and inexpensive means for protecting certain features of hand held media players. The apparatus may comprise any suitable configuration that fits securely within the recess of the data port or ports of a hand held device such as an MP3 player when the device is being utilized. For example, if the hand held device is held in an individual's pocket that contains coins, keys or any other object, the multiple pin connector assembly within the recess may be damaged or broken rendering the device inoperable. Alternately, water or other liquid may damage the multiple pin connector assembly.

The mechanical and moisture protection apparatus for electronic devices may simply comprise a handle for the user, a bearing plate that covers the recess and an insert that fits within the recess. In addition, a sealing means may also be utilized to further ensure a fluid tight seal. The apparatus may be constructed as a one-piece unitary structure or may comprise individual components. The apparatus may be constructed from any number of materials and utilizing any number of fabrication techniques. The apparatus is preferably light weight, inexpensive and easy to assemble.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE PREFERRED EMBODIMENTS

Figure 1:
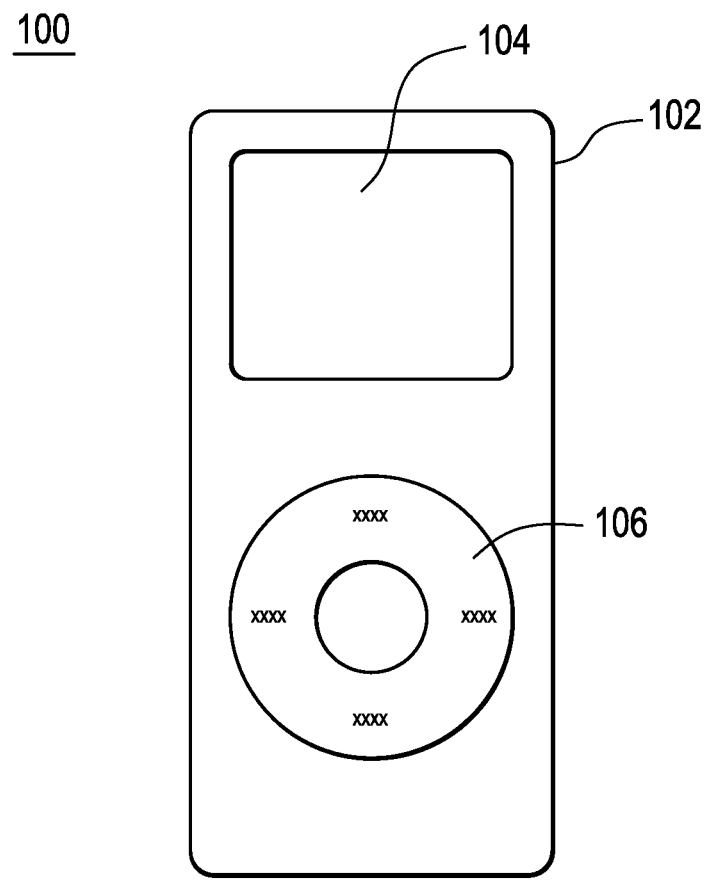
FIG. 1 is a diagrammatic representation of a top view of media player in accordance with the present invention.

Referring to FIG. 1, there is illustrated a diagrammatic representation of a handheld media player 100 in accordance with one exemplary embodiment of the present invention. As utilized herein, the term "media player" generally refers to computing devices that are dedicated to processing media such as audio, video or other images and include such devices as music players, video players, video recorders, cameras and the like, as well as combinations thereof. In other words, some media players comprise single functions, for example, a media player dedicated to playing music, and in other cases some media players comprise multiple functionality, for example, a media player that plays music (an MP3 device), displays video, stores pictures and the like. In either case, these devices are typically portable so as to allow a user to listen to music, play games or video, record video or take pictures whenever the user travels or is otherwise engaged in some activity.

As illustrated in FIG. 1, an exemplary media player 100 generally comprises a housing 102, a display 104 and a control panel or user interface 106. The type of display 102 and control panel 104 depends on the type of device. In the exemplary embodiment described herein, the media player 100 comprises a handheld device that is sized for placement into a pocket or other suitable receptacle of the user. By being sized for such, the user does not have to directly carry the device and therefore the device may be taken almost anywhere the user travels or be utilized while the individual engages in any number of various activities. For example, in the case of a music player, a user may use the device while working out in the gym, traveling in a car or skiing. Furthermore, the device may be operated solely by and in the users' hands, with no reference surface, such as a desktop, required.

The housing 102 both encloses and protects the various electrical components comprising the device, including various integrated circuits, as well as defining the shape or form of the media player 100. The housing 102 also dictates both the look and feel of the device as well as its functionality. The integrated circuits contained within the housing 102 may include a microprocessor, associated memory, a power supply, for example, a rechargeable battery, one or more circuit boards, a hard drive, other memory and various input/output support circuitry. The electrical components within the housing 102 may also include elements for inputting and/or outputting music or sound such as a microphone, amplifier and a digital signal processor, components for capturing images such as image sensors, as well as components for sending and receiving media.

The control panel or user interface 106 allows the user of the media player 100 to initiate actions on the media player 100 and provides the user with output associated with using the media player 100. The control panel or user interface 106 may comprise any suitable arrangement such as switches, buttons, keys, dials, trackballs, joysticks, touch pads, touch screens, displays, microphones, speakers, cameras and the like. Essentially, any suitable means for controlling and/or operating the device may be utilized as part of the user interface 106.

The display or display screen 104 is utilized to display a graphical user interface as well as other information to the user. For example, information that may be displayed includes text, objects and graphics. The display or display screen 104 may involve any suitable display mechanism including a liquid crystal display and a light emitting diode array.

Each of the elements described above have associated electronics that are mounted within the housing 102.

The media player 100 may also include one or more connections for receiving and transmitting data to and from the media player 100. By way of example, the media player 100 may include or more audio jacks, video jacks, data ports and the like. The media player 100 may also include one or more connectors for receiving and transmitting power to and from the media player 100. A more detailed description of these connection ports is given subsequently.

Figure 2:
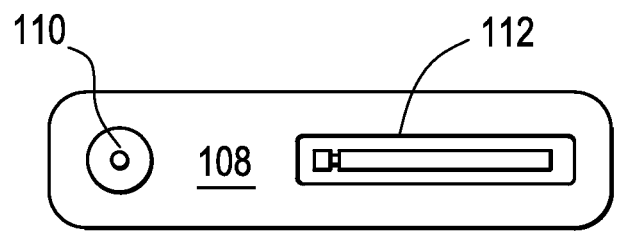
FIG. 2 is a diagrammatic representation of an end view of the media player of FIG. 1 in accordance with the present invention.

Referring to FIG. 2, there is illustrated a diagrammatic representation of an end face 108 of the media player 100 of FIG. 1 including a headphone jack 110 and a data port 112. The headphone jack 110 is configured to receive a headphone or speaker plug associated with headphones/speakers configured for listening to sound being output by the media player 102. The data port 112, on the other hand, is capable of receiving a data plug/cable assembly configured for transmitting and receiving data to and from a host device such as a general purpose computer. The data port 112 may be used to upload or download audio, video as well as other images to and from the media device 100. Although one data port 112 is illustrated, a media player 100 may have multiple ports 112. The data port 112 may comprise any suitable device such as a PS/2 port, a serial port, a parallel port, a network interface port and a USB port. The data port 112 may also be used as a power port for receiving a power plug/cable assembly for charging the battery or for supplying power for use.

Figure 3:
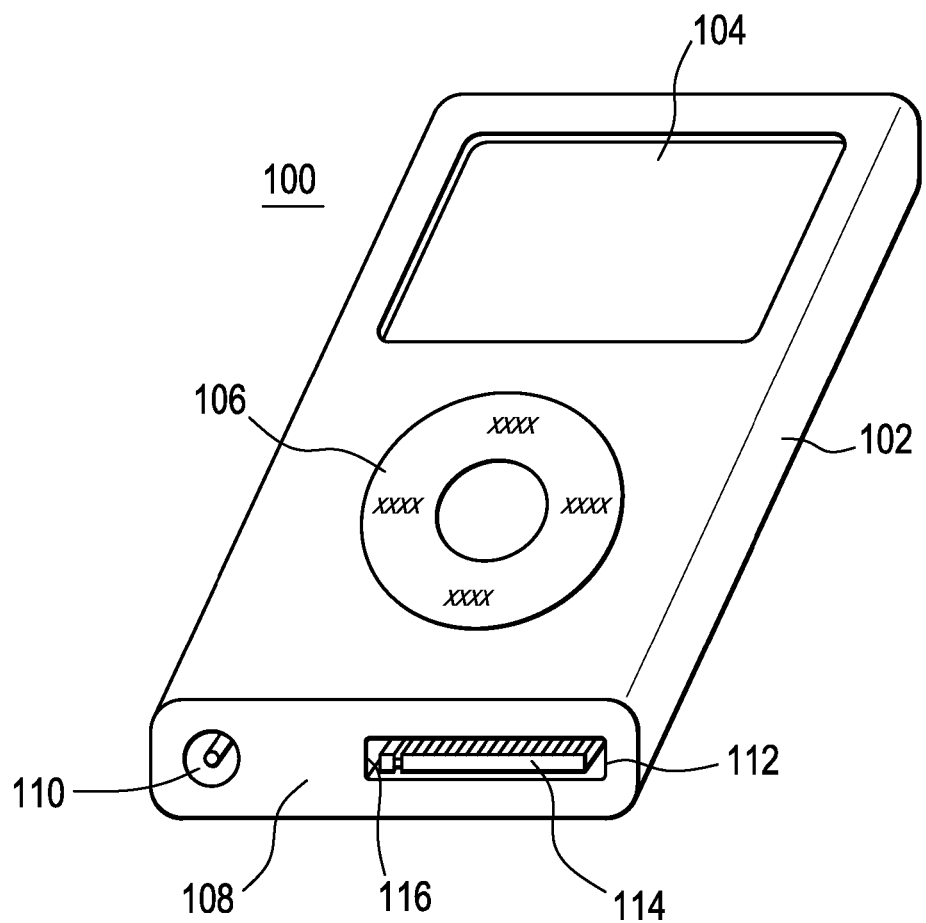
FIG. 3 is a detailed diagrammatic representation of the multiple pin connector assembly and audio connector of the media player of FIG. 1 in accordance with the present invention.

A typical data port 112 may comprise a multiple pin connection assembly 114 mounted within a recess or receptacle 116 formed within the end face 108 of the housing 102 of the media player 100 as illustrated in detail in FIG. 3. The multiple pin connector assembly 114 may be utilized to connect various external devices with the various internal components of the media player 100 depending upon the pin configuration. For example, if the battery of the media player 100 is to be charged, a cable (not shown) with an adapter having a specific pin configuration is connected to the multiple pin connector assembly 114 through the data port 112 such that the only pins making electrical contact with are the pins required to charge the battery. Various pin connections may be utilized to perform various functions required for use of the device, including downloading songs through data transfer. The multiple pin connection assembly 114 may comprise any number of pin combinations for any number of functions.

As illustrated in FIG. 3, the multiple pin connector assembly 114 resides within a recess or opening 116 formed in the end face 108 of the housing 102 of the media player 100. Accordingly, the data port 112 is configured as a female electrical receptacle and as such requires a male electrical adapter for making contact with the multiple pin connector assembly 114. The male electrical adapter may be affixed onto the end of a cable or be part of a base station or docking station for the media player 100. When the male electrical adapter is inserted into the opening 116, not only are electrical connection made, but the multiple pin connector assembly 114 is protected. However, when an individual is utilizing the device outside of the home, a headphone jack (not shown) is inserted into the headphone jack 110, but typically nothing is inserted into the data port 112 and as such there is a risk that the multiple pin connector assembly 114 may be mechanically damaged or broken depending upon where the media player 100 is held. For example, if the media player 100 is held in an individual's pocket that contains coins, keys or any other object of a similar nature, the multiple pin connector assembly 114 may be damaged or broken rendering the media player 100 inoperable. Alternately, water or other liquid may damage the multiple pin connector assembly 114 or the electronics to which it is connected. For example, if the user is skiing and ends up with some snow in his or her pocket, is may melt and seep into the data port 112 and damage the multiple pin connector assembly 114, the data port 112, the electronics within the media player 100 or any combination thereof. Accordingly, an apparatus that fits within the recess 116 when the data port 112 is not being utilized may function to protect the multiple pin connector assembly 114 as well as other components from foreign objects and moisture.

Figure 4:
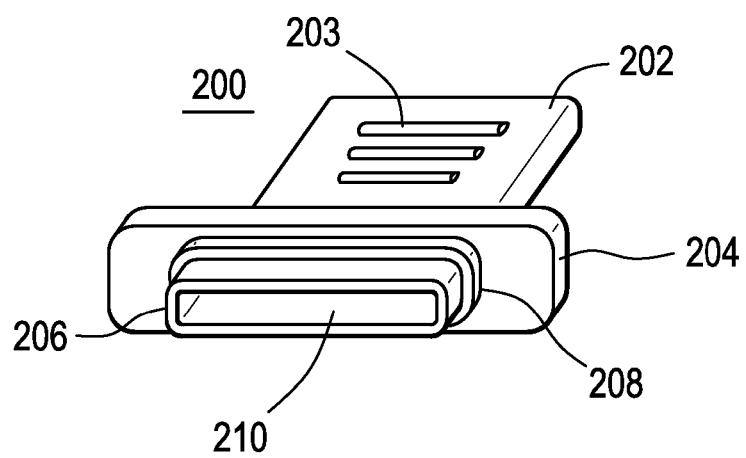
FIG. 4 is a diagrammatic representation of an exemplary mechanical and moisture protection apparatus for handheld electronic media players in accordance with the present invention.

FIG. 4 illustrates one exemplary embodiment of a mechanical and moisture protection apparatus 200 for handheld electronic media players in accordance with the is present invention. It is important to note that although a particular embodiment is illustrated, the apparatus may comprise any suitable configuration that fits securely within the recess 116 and protects the components therein. In addition, any suitable materials that allow for a secure and water/moisture tight fit may be utilized as explained in detail subsequently.

The mechanical and moisture protection apparatus 200 comprises a handle element 202, a bearing plate or face plate element 204, and insert element 206 and a sealing element 208. The apparatus 200 may be formed as a single unit or comprise separate components for each of the above-described elements or various sub-combinations of elements. Although exemplary embodiments are illustrated and described herein, it is important to note that any suitable shapes, sizes and configurations of the various components may be utilized in accordance with the present invention.

The handle element 202 may comprise any suitable configuration that allows the user to insert and/or remove the apparatus 200 from the recess 116. It is preferably long enough for the user to securely grab the apparatus 200 but not too large so as to interfere with storage of the media player 100 and the apparatus 200 when the media player 100 is being utilized for its intended purpose. For example, it should still comfortably fit within the user's pocket. In a preferred exemplary embodiment, a user should be able to grasp the handle element 202 with two fingers to insert and remove the apparatus 200. If necessary, the handle element 202 may be inserted or removed with one's teeth or any other suitable means. As illustrated, the handle element 202 comprises a substantially rectangular shape. The handle element 202 may also comprise ridges 203 on the surface thereof in order to provide a better grip. The handle element 202 may be formed from any suitable hard or soft material and fabricated utilizing any suitable fabrication technique, including injection molding and machining. Suitable materials include hard thermoplastics, for example, polystyrene, poly methyl methacrylate, acrylonitrile, butadiene styrene, polycarbonate, poly(ether ether ketone), poly(ether imide), poly (oxymethylene), poly(esters) such as PET and PBT, and poly(amides) such as nylon 6 and nylon 66 and/or soft polymers (elastomers), for example, poly(isoprene), poly(butadiene), poly(isobutylene), poly(urethanes), styrene-butadiene-styrene, poly (ester amides), poly(ether esters), silicone elastomers and poly (dimethylsiloxane).

The bearing plate or face plate element 204 may be permanently affixed to the handle element 202 via any number of bonding techniques, for example, gluing, it may be formed as a one-piece structure or it may be removably affixed to the handle element 202. The face plate element 204 functions as a cover over the recess 116. Accordingly, the size and shape of the face plate element 204 depends on the size and shape of the recess 116. In preferred exemplary embodiments, the face plate element 204 is larger than the recess 116 by an amount sufficient to prevent the insert element 206 from extending too far into the recess 116, thereby preventing damage to the multiple pin connector assembly 114. The face plate or bearing element 204 as illustrated is substantially rectangular in shape, but may be configured to comprise any suitable shape that completely covers the recess 116. The face plate element 204 may be formed from a suitable hard or soft material and fabricated utilizing any suitable fabrication technique, including injection molding and machining. Suitable materials include hard thermoplastics, for example, polystyrene, poly methyl methacrylate, acrylonitrile, butadiene styrene, polycarbonate, poly(ether ether ketone), poly(ether imide), poly (oxymethylene), poly(esters) such as PET and PBT, and poly(amides) such as nylon 6 and nylon 66 and/or soft polymers (elastomers), for example, poly(isoprene), poly(butadiene), poly(isobutylene), poly(urethanes), styrene-butadiene-styrene, poly (ester amides), poly(ether esters), silicone elastomers and poly(dimethylsiloxane).

The insert element 206 may be permanently affixed to at least one of the face plate element 204, the handle element 202 or both via any number of bonding techniques. It may be formed as a one-piece structure, or it may be removably affixed to the face plate element 204 or the handle element 202. The insert element 206 functions to fill in the space of the recess 116 and as such may assume any suitable size and configuration that is similar to the recess 116. The insert element 206 preferably extends into the recess 116 a distance sufficient to secure it therein, but not too far as to damage the multiple pin connector assembly 114. The insert element 206 is preferably sized to create an interference or friction fit with the recess 116 to prevent is it from accidentally or inadvertently falling out. The insert element 206 may be a solid structure or a hollow structure. The insert element 206 as illustrated is substantially rectangular in shape with rounded sides and is hollow. As with the other elements, the insert element 206 may be fabricated from any suitable hard or soft material and fabricated utilizing any suitable fabrication techniques, including injection molding and machining. Suitable materials include hard thermoplastics, for example, polystyrene, poly methyl methacrylate, acrylonitrile, butadiene styrene, polycarbonate, poly(ether ether ketone), poly(ether imide), poly (oxymethylene), poly(esters) such as PET and PBT, and poly(amides) such as nylon 6 and nylon 66 and/or soft polymers (elastomers), for example, poly(isoprene), poly (butadiene), poly(isobutylene), poly(urethanes), styrene-butadiene-styrene, poly (ester amides), poly(ether esters), silicone elastomers and poly(dimethylsiloxane).

Figure 5:
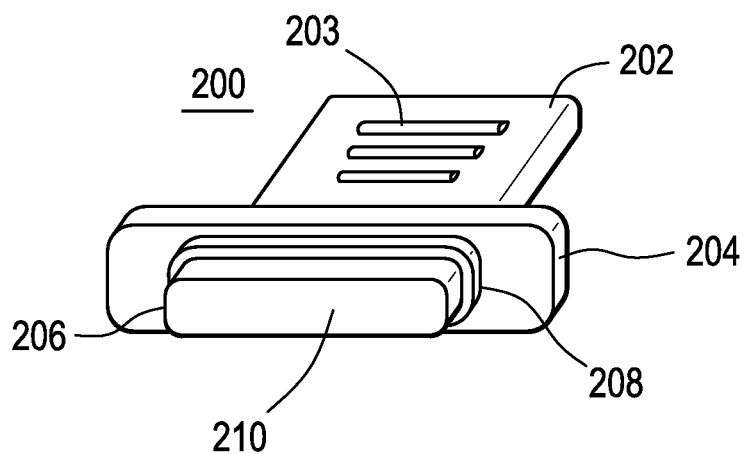
FIG. 5 is a diagrammatic representation of a second exemplary mechanical and moisture protection apparatus for handheld electronic media players in accordance with the present invention.

In the exemplary embodiment illustrated in FIG. 4, the insert element 206 comprises an opening 210. This opening 210 may be sized to cover the multiple pin connector assembly 114. In alternate exemplary embodiments, the insert element 206 may comprise a solid element 212 as illustrated in FIG. 5. If a solid element 212 is utilized, it is preferably sized so that no contact is made with the multiple pin connector assembly 114.

The sealing element 208 may be permanently or removably affixed to the face plate element 204, the insert element 206, or both. Unlike the other elements, the sealing element 208 is preferably made from a soft material as it functions to create a fluid tight seal between the recess 116, the face plate element 204 and insert element 206. Essentially, the sealing element 208 is a washer or O-ring type device that functions as both a moisture barrier and a securement device. The sealing element 208 is preferably beveled such that with a little force the user can push the apparatus 200 into the recess 116 and create a secure and water tight fit. Exemplary materials for the sealing element include soft materials such as silicone elastomers and poly(dimethylsiloxane).

As described above, the apparatus 200 may be a one piece structure or a modular structure. The apparatus may be formed from any number of materials and is fabricated utilizing any number of techniques. Various components may be joined together as subassemblies and as such replace parts may be utilized in case of damage.

Figure 6:
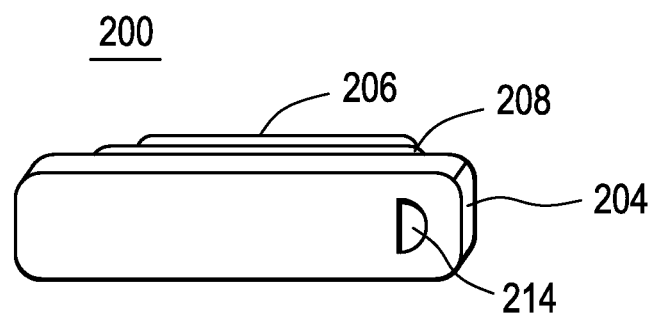
FIG. 6 is a diagrammatic representation of a third exemplary mechanical and moisture protection apparatus for handheld electronic media players in accordance with the present invention.

In an alternate exemplary embodiment, the mechanical and moisture protection apparatus 200 of the present invention may simply comprise a bearing or face plate element 204, an insert element 206 and potentially a sealing element 208 as illustrated in FIG. 6. In other words, in this exemplary embodiment, no handle 202 is necessary. In this exemplary embodiment, the face plate element 204 comprises a slot or other opening 214 so that the user may easily remove the apparatus 200 from the recess 116. This opening 214 may be equivalent to the slot used on many electronic devices for the battery cover.

Although shown and described is what is believed to be the most practical and preferred embodiments, it is apparent that departures from specific designs and methods described and shown will suggest themselves to those skilled in the art and may be used without departing from the spirit and scope of the present invention. The present invention is not restricted to the particular constructions described and illustrated, but should be construed to cohere with all modifications that may fall within the scope of the appended claims.

What is claimed is:

1. A removable protection apparatus for handheld, portable electronic devices comprising:
   a handle element configured for insertion and removal of the protection apparatus into a handheld, portable electronic device;
   a bearing plate element affixed to the handle element and configured to cover a recess in an electronic devices; and
   an insert element affixed to at least one of the handle element or the bearing plate element, the insert element being configured for insertion into and removal from the recess in a handheld, portable electronic device, the insert element frictionally engaging the recess.

2. The removable protection apparatus for handheld portable electronic devices according to claim 1, further comprising a sealing element positioned around the insert element and proximate the bearing plate element, the sealing element being configured for at least partial engagement with the recess in the handheld, portable electronic device and to provide a seal between the bearing plate and the recess in an electronic device.

3. The removable protection apparatus for handheld, portable electronic devices according to claim 2, wherein the sealing element comprises a beveled edge.

4. The removable protection apparatus for handheld, portable electronic devices according to claim 3, wherein the beveled edge of the sealing element is configured to at least partially fit within the recess of the handheld, portable electronic device.

5. The removable protection apparatus for handheld, portable electronic devices according to claim 2, wherein the handle element comprises a tab structure sized for two finger use.

6. The removable protection apparatus for handheld, portable electronic devices according to claim 2, wherein the bearing plate is configured to cover an area larger than the recess in the handheld, portable electronic device.

7. The removable protection apparatus for handheld, portable electronic devices according to claim 2, wherein the insert element comprises a size and shape substantially equivalent to the recess in the handheld, electronic device.

8. The removable protection apparatus for handheld, portable electronic devices according to claim 7, wherein the insert element comprises a solid structure.

9. The removable protection apparatus for handheld, portable electronic devices according to claim 7, wherein the insert element comprises a hollow structure.

10. A removable protection apparatus for handheld, portable electronic devices comprising:
    a bearing plate configured to cover a recess in a handheld, portable electronic device, the bearing plate comprising an access slot for removal of the protection apparatus; and
    an insert element affixed to the bearing plate element, the insert element being configured for insertion into and removal from the recess in the handheld, portable electronic device, the insert element frictionally engaging the recess.

* * * * *